United States Patent Office 3,207,775
Patented Sept. 21, 1965

3,207,775
2,5-DICHLOROBENZYL DIISOPROPYLDITHIO-CARBAMATE
John J. D'Amico, Charleston, and Marion W. Harman, Dunbar, W. Va., assignors to Monsanto Company, a corporation of Delaware
No Drawing. Original application July 3, 1961, Ser. No. 121,370, now Patent No. 3,144,475, dated Aug. 11, 1964. Divided and this application Oct. 3, 1963, Ser. No. 313,435
1 Claim. (Cl. 260—455)

This application is a division of application Serial No. 121,370, filed July 3, 1961, now Patent No. 3,144,475, which application is a continuation-in-part of application Serial No. 657,051, filed May 6, 1957, now U.S. Patent No. 2,992,091, dated June 11, 1961.

This invention relates to 2,5-dichlorobenzyl diisopropyldithiocarbamate. This compound has the property of destroying undesired vegetation and particularly the property of destroying wild oats at low, economic levels of toxicant. The wild oat (*Avena fatua*) presents a weed problem which has plagued farmers throughout large sections of the world for generations.

Benzyl esters may be prepared by condensing benzyl halide or substituted benzyl halide with a salt of a thiocarbamic acid. As illustrative of the preparation of a substituted benzyl halide, $\alpha$-2,3,4-tetrachlorotoluene was prepared by light catalyzed chlorination of 2,3,4-trichlorotoluene. 283 grams of the trichlorotoluene was heated to 180° C. and then with a sunlamp placed 8 to 10 inches from the pot, 50 grams of chlorine added over 40 minutes at 180 to 200° C. The product was distilled in vacuo to yield $\alpha$-2,3,4-tetrachlorotoluene as a colorless liquid B.P. 137–142° C. at 10 mm. Hg.

$\alpha$-2,5-trichlorotoluene was prepared by light catalyzed chlorination of 2,5-dichlorotoluene in a manner similar to that described. The desired product was isolated by fractional distillation as a colorless liquid, B.P. 132–136° C. at 25 mm. Hg. 2,5-dichlorobenzyl diisopropyldithiocarbamate formed in 78.7% yield upon condensing with sodium diisopropyldithiocarbamate. It was a viscous oil which solidified on standing, analyzing 3.82% nitrogen compared to a calculated value of 4.11%.

Although the ester is insoluble in water it is soluble in common organic solvents. It may be dispersed directly in water or a solution in an organic solvent emulsified in aqueous medium by the aid of a dispersing agent. As dispersing and wetting agents there may be employed soft or hard sodium or potassium soaps, alkylated aromatic sodium sulfonates such as sodium dodecylbenzenesulfonate, an amine salt as for example dibutylammonium dodecylbenzenesulfonate, alkali metal salts of sulfated fatty alcohols, ethylene oxide condensation products of alkyl phenols, or tall oil or higher mercaptans and other dispersing and wetting agents. Formulation of dry compositions is accomplished by mixing with finely divided solid carriers. Suitable carriers comprise talc, clay, pyrophyllite, silica and fuller's earth. Usually the toxicant will be only a minor proportion. The dry formulation may be used as a dust or dispersed in aqueous medium before application. In the latter it is convenient to incorporate a wetting or dispersing aid into the formulation.

As illustrative of the toxicity to wild oats the ester was dissolved in a relatively high volume of volatile organic solvent and applied as a spray to the soil surface of pans seeded with a counted number of wild oat seeds. About 14 days after application of the toxicant results were observed and recorded. The number of seeds emerging was converted to weighted herbicidal ratings based on average percent germination of any particular seed lot times an injury factor. This evened irregularities of ratings on seeds which varied in percent germination. The injury factor took into consideration any plants not expected to survive. Thus, phytotoxicity ratings were based on the number of plants which emerged and would survive as observed two weeks after planting. Herbicidal ratings were assigned by means of the following conversion scale:

Percent emergence:      Phytotoxicity rating
    0–25 _____ 3 or severe.
    26–50 _____ 2 or moderate.
    51–75 _____ 1 or slight.
    76–100 _____ 0 or none.

|  | Dosage, Lbs./Acre | Phytotoxicity Rating to Wild Oats |
|---|---|---|
| 2,5-Dichlorobenzyl diisopropyldithiocarbamate | ¼ | 3 |

2,5-Dichlorobenzyl diisopropyldithiocarbamate is also toxic to nut grass, another pernicious weed.

It is intended to cover all changes and modifications of the examples of the invention herein chosen for purposes of disclosure which do not constitute departures from the spirit and scope of the invention.

What is claimed is:
2,5-dichlorobenzyl diisopropyldithiocarbamate.

No references cited.

CHARLES B. PARKER, *Primary Examiner.*